Inventor:
WILHELM FRIEDRICH

June 27, 1939.  W. FRIEDRICH  2,164,153
APPARATUS FOR PRODUCING FIRE EXTINGUISHING FOAM
Filed Sept. 15, 1937.  2 Sheets-Sheet 2

Inventor:
WILHELM FRIEDRICH
by N Philip Churchill

Patented June 27, 1939

2,164,153

UNITED STATES PATENT OFFICE 2,164,153

APPARATUS FOR PRODUCING FIRE EXTINGUISHING FOAM

Wilhelm Friedrich, Berlin-Charlottenburg, Germany

Application September 15, 1937, Serial No. 163,905
In Germany September 18, 1936

4 Claims. (Cl. 261—76)

The present invention relates to a device for feeding a foam forming agent to conduits carrying water under pressure (so-called "intermediate mixers"), particularly for generating fire extinguishing air foam. This invention is a further development of the inventions disclosed by my earlier U. S. Patents 2,003,184 dated May 28, 1935, and 2,073,204 dated March 9, 1937.

The novel device constructed according to the present invention permits of the foam former being directly introduced at any point into the pressure water piping leading from the source of water under pressure, e. g. a motor pump or a hydrant, to the foam generating jet pipe. By a particular arrangement of this intermediate mixer, there is afforded the possibility of optionally controlling or even fully cutting off the supply of the foam forming agent, for instance when, instead of a foam jet, water only is to be projected.

The intermediate mixer constructed according to the invention essentially comprises a suitable jet apparatus adapted to be inserted in the pressure water pipe, and the suction side of which can controllably be connected to a foam former container.

In order that the passage provided for the water may be regulated in accordance with the amount of foam produced by the particular foam generator used, the intermediate mixer is further provided with a pressure-water by-pass connected in parallel to the jet apparatus and which is equipped with a member adapted to adjust the cross section of passage of the by-pass according to the amount of water required for foam generation within the foam jet pipe. As by varying the cross section of the water passage in the by-pass, the suction work of the jet apparatus can be influenced at will, this also affords the possibility of controlling simultaneously the supply of the foam forming agent, by means of the shut-off device concerned.

In the accompanying drawings the novel device is represented in several embodiments.

Figure 1:
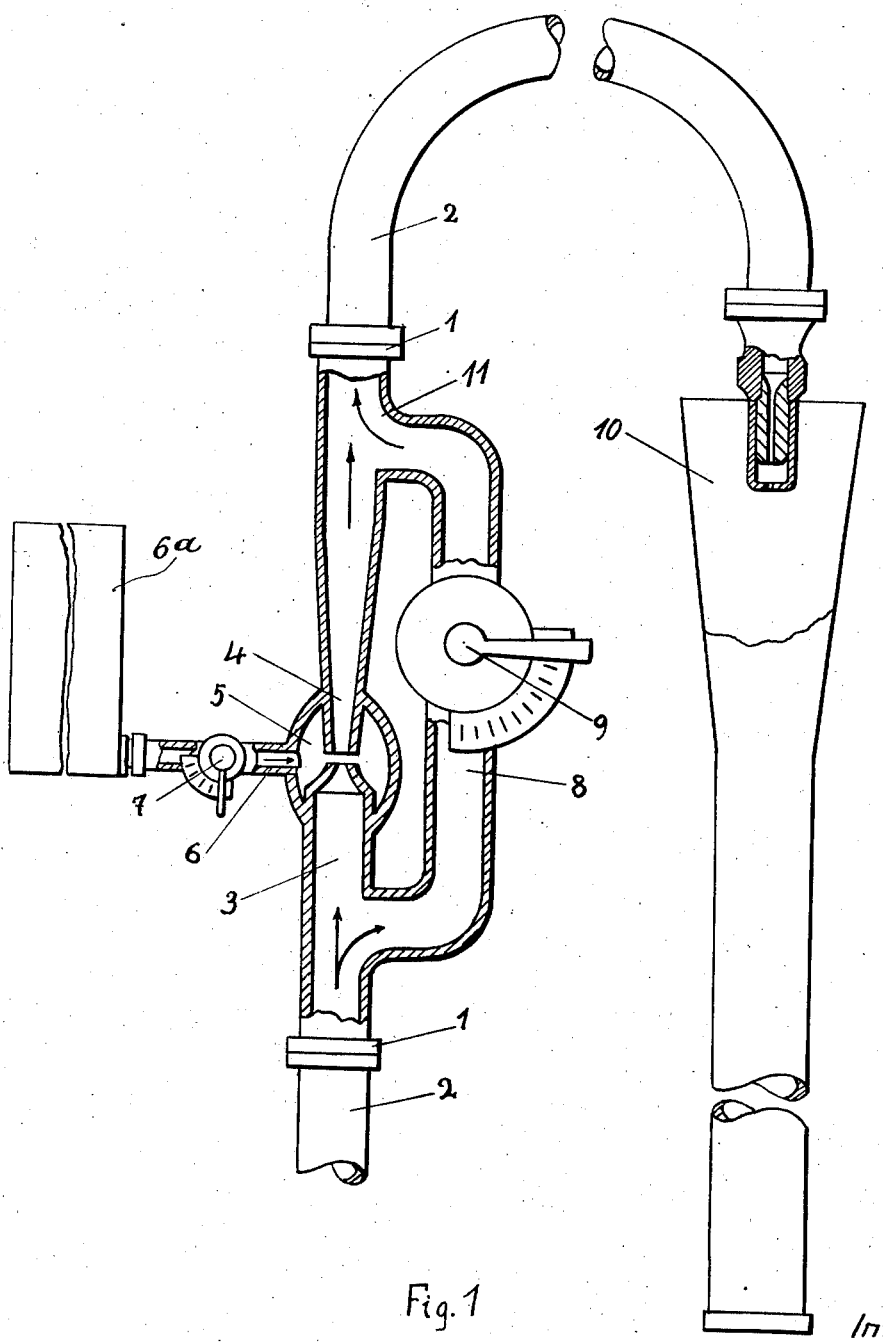
Figure 2:
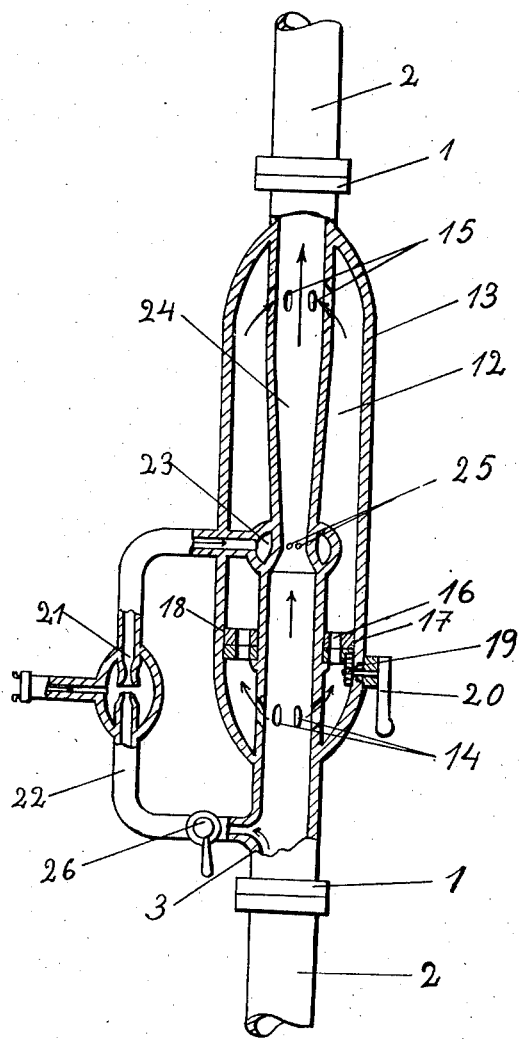

Fig. 1 shows an intermediate mixer in connection with a foam generating jet apparatus, partly in section, Fig. 2 shows another embodiment likewise partly in section.

The intermediate mixer connected to a foam generator, as shown in Fig. 1, consists of a pipe 3 adapted to be inserted in the pressure water pipe 2 by means of coupling members 1, 1 and which contains a jet apparatus or ejector 4. The suction chamber 5 of the ejector 4 is connected to a feeding pipe 6 for the foam forming agent which pipe can be connected to a foam former container 6a and is provided with a member 7 intended for the control of the foam former supply. In parallel to the ejector 4 there is arranged a pressure-water by-pass 8 which contains the member 9 adapted to control the passage of water.

The modus operandi of the device described is as follows: The water flowing through the pipe 3 and the ejector 4 draws in the foam forming agent through the pipe 6 and while being mixed with the said foam forming agent it flows into the pipe 2 leading to the foam generator 10. The presure water stream flowing through the by-pass pipe 8 enters the pipe 3 as at 11 and here it mixes with the mixture of water and foam former emerging from the ejector 4 so that a uniformly diluted solution of the foam forming agent is obtained. The stream of the water under pressure and the supply of the foam forming agent may by the members 7 and 9, respectively, be controlled in accordance with the particular amounts of water and foam former required. When instead of foam jets, a jet of water is to be projected, the delivery of the foam forming agent may be shut off by closing the member 7.

In the embodiment shown by Fig. 2 the water under pressure is by-passed by a chamber 12, which is formed by the pipe 3 and a shell 13 surrounding the same. The by-passed portion of the water under pressure in this instance flows through apertures 14 of the pipe 3 into the chamber 12 and then returns into the pipe 3 through apertures 15. For the control of the passage of water the chamber 12 contains a disc 17 provided with openings 16 against which disc bears another disc 18 provided with registering openings and which is adapted to be angularly displaced relatively to the first named disc so that the cross section of the passage openings 16 may be modified. The angular displacement of the disc 18 is e. g. accomplished by means of a bevel gear 19 meshing with the teeth of the disc 18 and susceptible of being turned by means of a handle 20.

In order to increase the suction work of the intermediate mixer, it may be equipped with an additional ejector, into which a certain amount of the foam former is drawn in by means of a portion branched off the water under pressure and from which the mixture of water and foam former is led into the suction chamber of the ejector disposed within the main stream of the water under pressure. In the case of such a device, the suction thus takes place in two steps. As illustrated the ejector 21 is arranged within a piping 22 branched off the pipe 3 and which is connected through an annular conduit 23 to the suction device represented here by way of example as a Venturi tube 24. The mixture of water and foam former as coming from the ejector 21 is drawn in through the openings 25 by the main water stream and mixed therewith as well as with the water under pressure fed through the by-pass 12 and the openings 15.

For the control of the suction power the branch pipe 22 may be provided with a controlling member 26.

What I claim is:

1. Apparatus for producing fire extinguishing foam including means for projecting a jet of water into a receiver to entrain air under substantially atmospheric pressure, and means for supplying to said projecting means water under pressure containing foam stabilizing material, said supplying means comprising a conduit carrying water under pressure, an ejector including a nozzle and a receiver, means for by-passing a portion of the water from said conduit through said ejector to aspirate foam stabilizing solution thereby, and means connecting the receiver side of said ejector to a low pressure portion of said conduit.

2. Apparatus as defined in claim 1 in which means is provided for by-passing a controlled quantity of water around the low pressure portion of the conduit.

3. Apparatus for producing fire extinguishing foam by aspirating air into a liquid stream comprising a conduit carrying water under pressure and having a restricted portion in the shape of a Venturi tube, an ejector having a nozzle and receiver, a container for a solution of foam stabilizing material connected to the suction side of said ejector, means for by-passing water under pressure through said nozzle from a point in said conduit in advance of said Venturi tube, and means connecting the receiver side of said ejector to the restricted portion of said Venturi tube.

4. Apparatus for producing fire extinguishing foam by aspirating air into a liquid stream comprising a conduit carrying water under pressure and having a suction device located in an intermediate portion thereof, an ejector for aspirating foam stabilizing solution from a container, and means for passing through said ejector a controlled portion of water under pressure from a point in said conduit in advance of said suction device and for returning said portion carrying foam stabilizing material from said ejector to the suction side of said suction device.

WILHELM FRIEDRICH.